June 29, 1926.
L. McKINNON
RESILIENT TIRE
Filed May 4, 1925
1,590,533
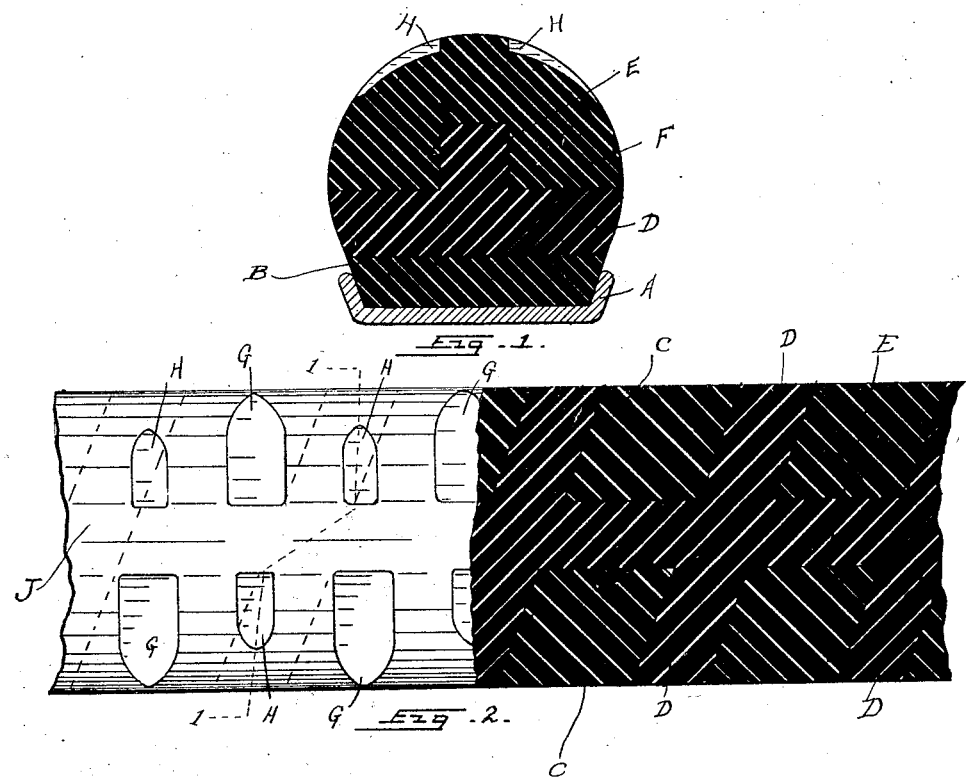
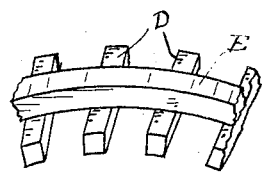
Inventor
Lemuel McKinnon
By J. M. Thomas
Attorney Patented June 29, 1926.

1,590,533

UNITED STATES PATENT OFFICE.

LEMUEL McKINNON, OF SALT LAKE CITY, UTAH.

RESILIENT TIRE.

Application filed May 4, 1925. Serial No. 28,040.

My invention relates to automobile tires and has for its object to provide a new and economical automobile tire to be used on commercial cars.

A further object is to provide easy riding, resilient tires having a sponge rubber core.

These objects I accomplish with the tire illustrated in the accompanying drawings in which similar letters and numerals of reference indicate like parts throughout the several views and as described in the specification forming a part of this application and pointed out in the appended claims.

In the drawings of which I have shown the best and most substantial embodiment of my invention, Figure 1 is a section of the tire on line 1—1 of Figure 2; Figure 2 is a view of a section of the tread of the tire with parts cut away; Figure 3 is a view in perspective of the sponge rubber portion of my tire segregated to show the shape of the sponge portion.

It has long been the practice to make solid rubber tires for trucks and commercial vehicles and for use on the lighter touring cars, and with my tire I provide an easy riding and resilient tire with a non-skid tread and with resilient integral portions therein which increases the resilient qualities without weakening the construction of the tire in any way.

In the drawings I have shown the rim on which my tire is mounted as A. The tire consists of a solid rubber portion B which is vulcanized to give the toughness and strength of the commonly used solid tires. On the periphery of said portion B are integrally formed spaced apart transverse strips of similar rubber material C, and other strips alternate therewith of sponge or porous rubber D, angularly disposed as to the circumference of the tire. On the periphery of said portions C and D is integrally formed an annular band of the sponge rubber E as a core for the tread portion F of my tire. The said tread portion F surrounds the sides and periphery of said sponge core E. The periphery of said tread portion F of my tire has alternate spaced apart recesses G and H formed therein, in spaced apart rows, leaving an annular wearing band J of the tough rubber longitudinally thereon. The said recesses G and H are spaced apart and are staggered as to each other and relative to said wearing band J, and are gradually tapered from an edge at the ends near the sides of the tire to their greatest depth which occurs at the sides of said band J, as shown at 1. The band portion J is in circumferential alinement with the said core portion E. The recesses G and H on the tread of the tire make a non-skid tread for the tire and also give the more solid rubber between the lateral strips more of a chance to give, and allow the most of the wear of the tire over the soft lateral strips D, thereby providing a more resilient tire and also giving it more elasticity and, therefore, giving the tire longer life.

Having thus described my invention, I desire to secure by Letters Patent and claim:—

1. A vehicle tire comprising a portion contiguous the rim of the wheel made of solid rubber having spaced apart transverse integral portions; an annular sponge rubber core having transverse portions integral therewith and filling the spaces between the first mentioned transverse portions; and a tread portion contiguous the upper faces of said sponge rubber portions, all of which forms a heterogeneous tire.

2. A vehicle tire comprising a sponge rubber core with transverse spaced apart angularly disposed supports integral therewith, and a tubular portion with transverse spaced apart spaces therein, which spaces are filled with the said transverse angularly disposed sponge portions; and a tread member, all of which has been formed into an integral structure.

3. A vehicle tire comprising a band of solid resilient rubber contiguous a metal rim; and superimposed on said band spaced apart transverse angularly disposed portions of resilient rubber; an annular core of sponge rubber superimposed on transverse spaced apart angularly disposed portions also of sponge rubber, and a tread portion resting on said sponge rubber annular core and on the extended other sponge rubber spaced apart portions, with other portions of the tread contiguous the sides of said sponge rubber core, all of which has been made into one heterogeneous tire.

In testimony whereof I have affixed my signature.

LEMUEL McKINNON.